United States Patent
Li

(10) Patent No.: US 11,325,499 B2
(45) Date of Patent: May 10, 2022

(54) MULTI-BATTERY SYSTEM FOR AN ELECTRIC VEHICLE

(71) Applicant: DARFON ELECTRONICS CORP., Taoyuan (TW)

(72) Inventor: Pei-Chen Li, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/099,696

(22) Filed: Nov. 16, 2020

(65) Prior Publication Data

US 2021/0178929 A1 Jun. 17, 2021

(30) Foreign Application Priority Data

Dec. 11, 2019 (TW) .................................. 108145302

(51) Int. Cl.
*B60L 58/18* (2019.01)
*H02J 7/00* (2006.01)
*B60L 50/60* (2019.01)

(52) U.S. Cl.
CPC .............. *B60L 58/18* (2019.02); *B60L 50/66* (2019.02); *H02J 7/0013* (2013.01); *H02J 7/00032* (2020.01); *H02J 7/0047* (2013.01)

(58) Field of Classification Search
None
See application file for complete search history.

(56) References Cited

U.S. PATENT DOCUMENTS

| | | | |
|---|---|---|---|
| 7,453,236 B2 | 11/2008 | Eguchi | |
| 10,243,923 B2 | 3/2019 | Jo | |
| 2016/0359329 A1 | 12/2016 | Kim | |
| 2018/0056805 A1* | 3/2018 | Shen | ...................... H02J 7/0025 |
| 2019/0152342 A1* | 5/2019 | Shen | ................... H01M 50/502 |
| 2019/0356025 A1* | 11/2019 | Sung | ..................... H01M 10/42 |

FOREIGN PATENT DOCUMENTS

| | | |
|---|---|---|
| EP | 1 462 299 B1 | 4/2009 |
| GB | 2 341 258 A | 3/2000 |
| KR | 10-1479554 B1 | 1/2015 |
| TW | 201240190 A1 | 10/2012 |
| TW | 201807920 A | 3/2018 |

* cited by examiner

*Primary Examiner* — Jared Fureman
*Assistant Examiner* — Aqeel H Bukhari
(74) *Attorney, Agent, or Firm* — Winston Hsu

(57) ABSTRACT

A multi-battery system includes a plurality of batteries, a first connector having a first identification unit, and a second connector having a second identification unit. Each battery includes a microcontroller, and a battery connector having a detection unit. The first connector is for electrically connecting a battery connector of a first battery of the plurality of batteries and a motor controller. The second connector is for electrically connecting a battery connector of a second battery of the plurality of batteries and the motor controller. When the first identification unit is set to a first predetermined value, and a detection unit of the first battery is electrically connected to the first identification unit, a microcontroller of the first battery sets the first battery as a master battery.

6 Claims, 8 Drawing Sheets

MULTI-BATTERY SYSTEM FOR AN ELECTRIC VEHICLE

BACKGROUND OF THE INVENTION

1. Field of the Invention

The present invention is related to a multi-battery system, more particularly to a multi-battery system for an electric vehicle.

2. Description of the Prior Art

Various electric vehicles on the market use multiple batteries in order to increase the driving distance. When multiple batteries are used, one battery is usually set as the master battery to communicate with the motor controller and manage other slave batteries. The conventional technology, such as the U.S. Pat. No. 8,912,758, uses a setting switch to set the battery as master battery or slave battery. However, this method is not as convenient for the user, and the switch will likely be exposed to moisture intrusion, thus causing circuit damage.

SUMMARY OF THE INVENTION

An embodiment provides a multi-battery system for an electric vehicle. The multi-battery system includes a plurality of batteries, a first connector having a first identification unit, and a second connector having a second identification unit. Each battery includes a microcontroller, and a battery connector having a detection unit. The first connector is for electrically connecting a battery connector of a first battery of the plurality of batteries and a motor controller. The second connector is for electrically connecting a battery connector of a second battery of the plurality of batteries and the motor controller. When the first identification unit is set to a first predetermined value, and a detection unit of the first battery is electrically connected to the first identification unit, a microcontroller of the first battery sets the first battery as a master battery. When the second identification unit is set to a second predetermined value, and a detection unit of the second battery is electrically connected to the second identification unit, a microcontroller of the second battery sets the second battery as a slave battery.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
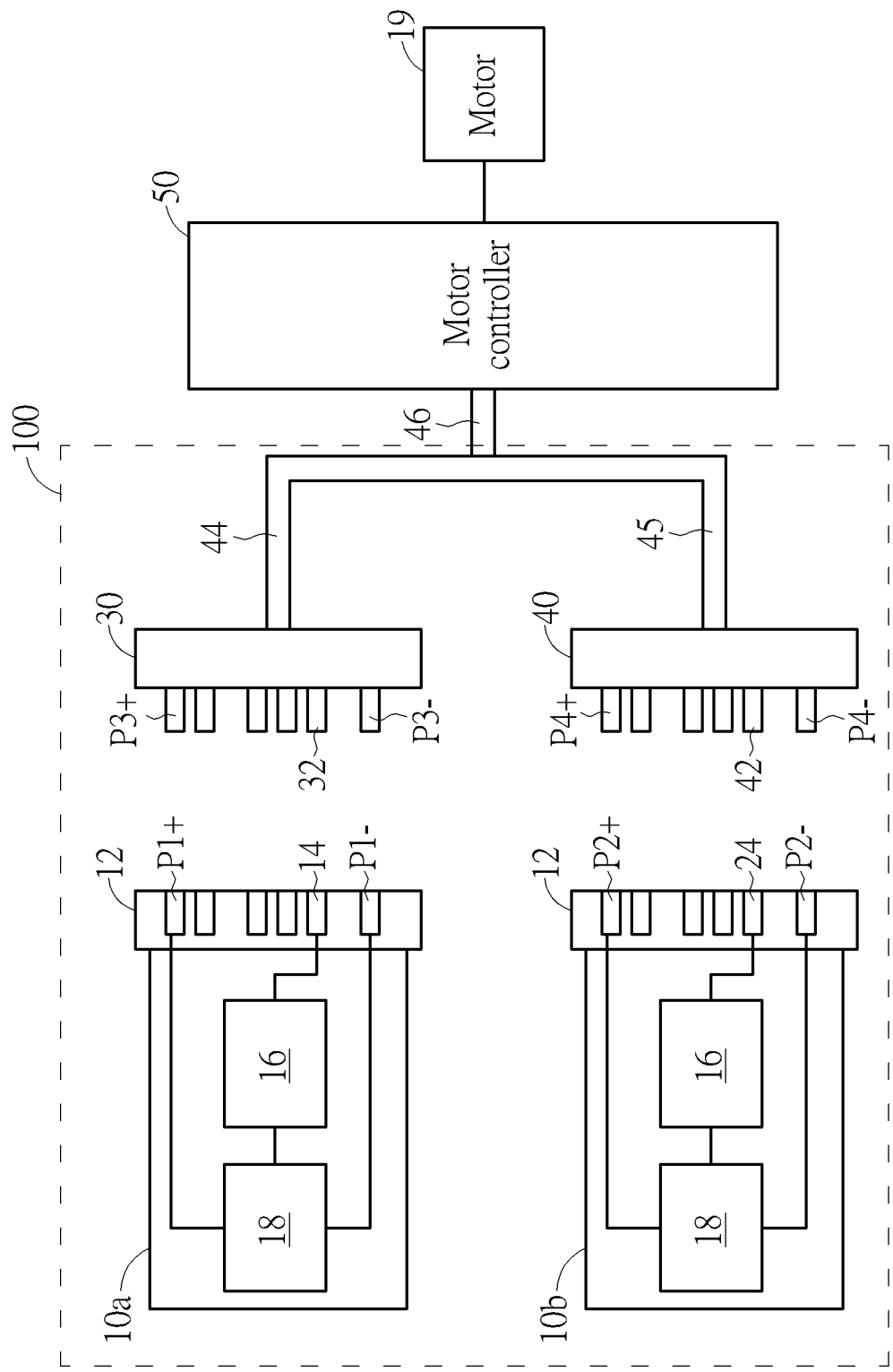
FIG. 1 is a diagram of a multi-battery system for an electric vehicle of an embodiment of the present invention.

FIG. 1 is a diagram of a multi-battery system 100 for an electric vehicle of an embodiment of the present invention. The multi-battery system 100 includes a plurality of batteries 10a and 10b, a first connector 30 and a second connector 40. The battery 10a includes a microcontroller 16, a battery connector 12, a battery cell 18, a positive port P1+, and a negative port P1−. The battery connector 12 has a detection unit 14. The positive port P1+ is electrically connected to a positive terminal of the battery cell 18, and the negative port P1− is electrically connected to the negative terminal of the battery cell 18. The first connector 30 has a first identification unit 32, a first positive terminal P3+, and a first negative terminal P3−. The first connector 30 is for connecting the battery connector 12. The second connector 40 has a second identification unit 42, a second positive terminal P4+ and a second negative terminal P4−. The second connector 40 is for connecting the battery connector 12. The first connector 30 is electrically connected to the motor controller 50 through a cable 44 and a cable 46. The second connector 40 is electrically connected to the motor controller 50 through a cable 45 and the cable 46. The motor controller 50 is for providing power and control signals to a motor 19 of the electric vehicle.

Figure 2:
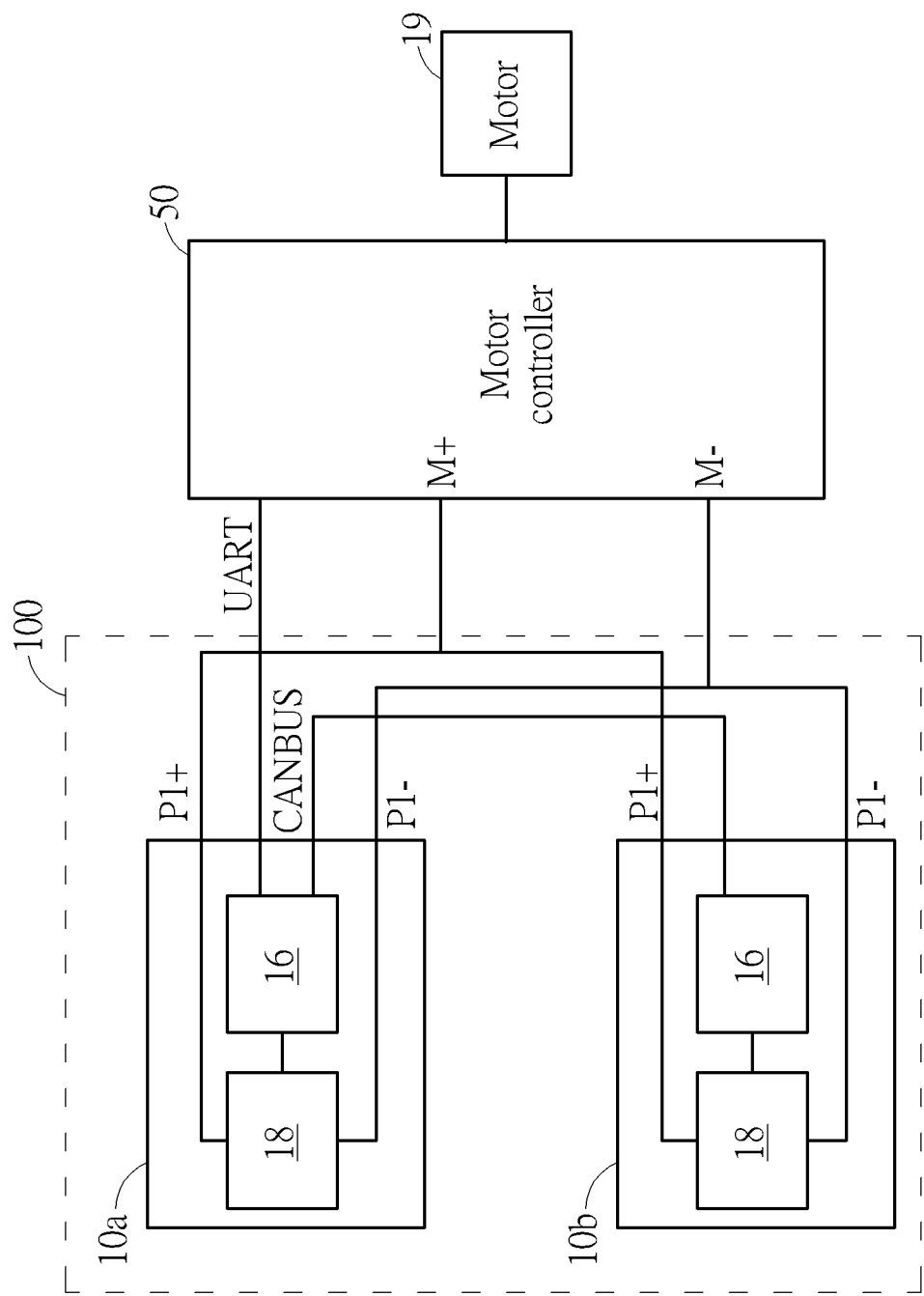
FIG. 2 is another diagram of the multi-battery system of FIG. 1.

FIG. 2 is another diagram of the multi-battery system 100 of FIG. 1. The positive terminal M+ of the motor controller 50 is electrically connected to the first positive terminal P3+ of the first connector 30 and the second positive terminal P4+ of the second connector 40. The negative terminal M− of the motor controller 50 is electrically connected to the first negative terminal P3− of the first connector 30 and the second negative terminal P4− of the second connector 40. The microcontrollers 16 of the batteries 10a and 10b are connected via cable 44 and cable 45 (as shown in FIG. 1), and a communication protocol, such as CANBUS (controller area network bus) can be implemented. The battery 10a includes a microcontroller 16 for executing a firmware. In addition, the first positive terminal P3+ and the first negative terminal P3− have wires to connect to a charger to charge the battery 10a. Similarly, the second positive terminal P4+ and the second negative terminal P4− have wires to connect to the charger to charge the battery 10b. When the battery 10a functions as the master battery, the microcontroller 16 executes the communication protocol to communicate with the motor controller 50 via the first connector 30, the cable 44, and the cable 46. For example, a universal asynchronous transceiver (UART) can be used for communication.

Figure 3:
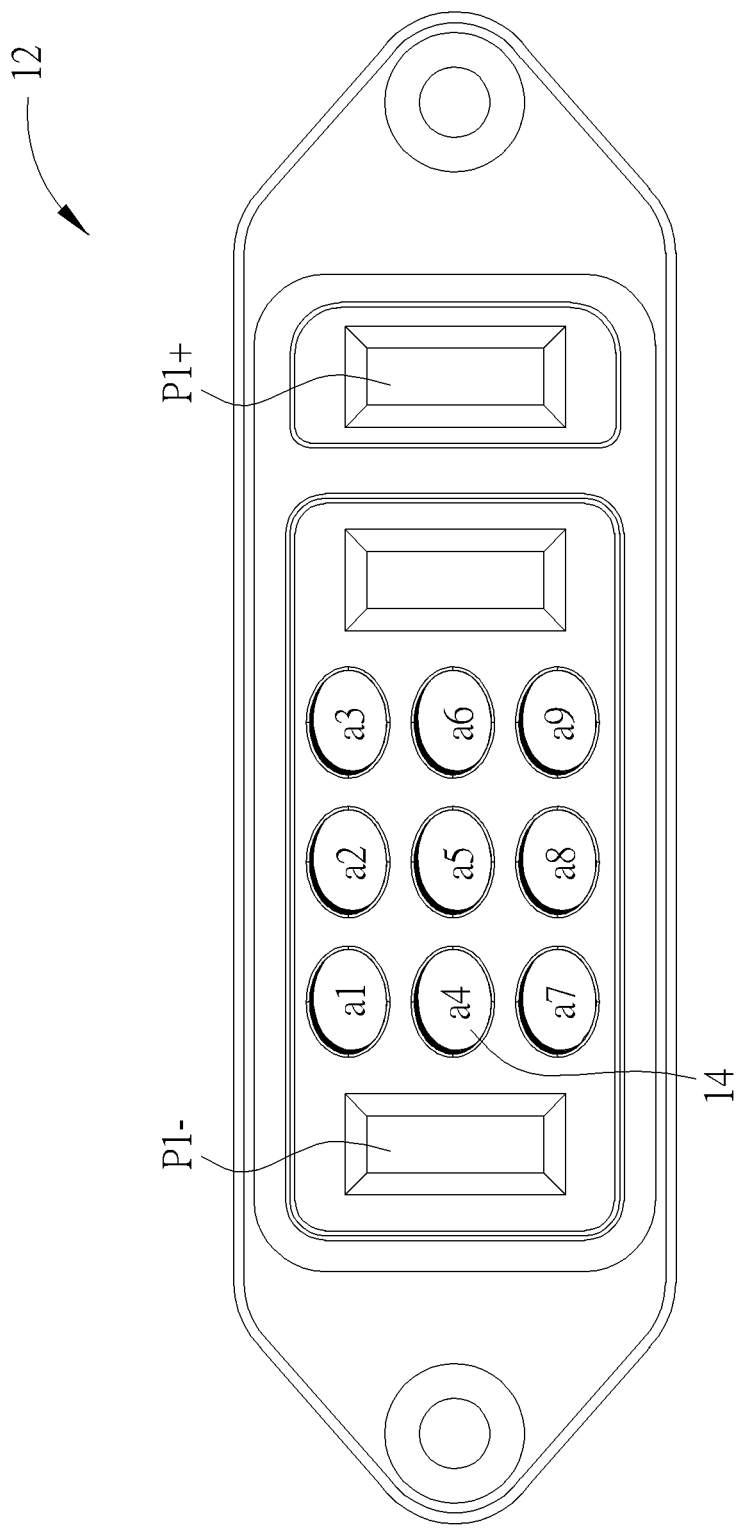
FIG. 3 is a diagram of the battery connector of the multi-battery system of FIG. 1.

FIG. 3 is a diagram of the battery connector 12 of the multi-battery system 100 of FIG. 1. The detection unit 14 of the battery connector 12 can be the first pin a4. The CANBUS pins can be pin a8 and pin a9, and the UART pins can be pin a2 and pin a3.

Figure 4A:
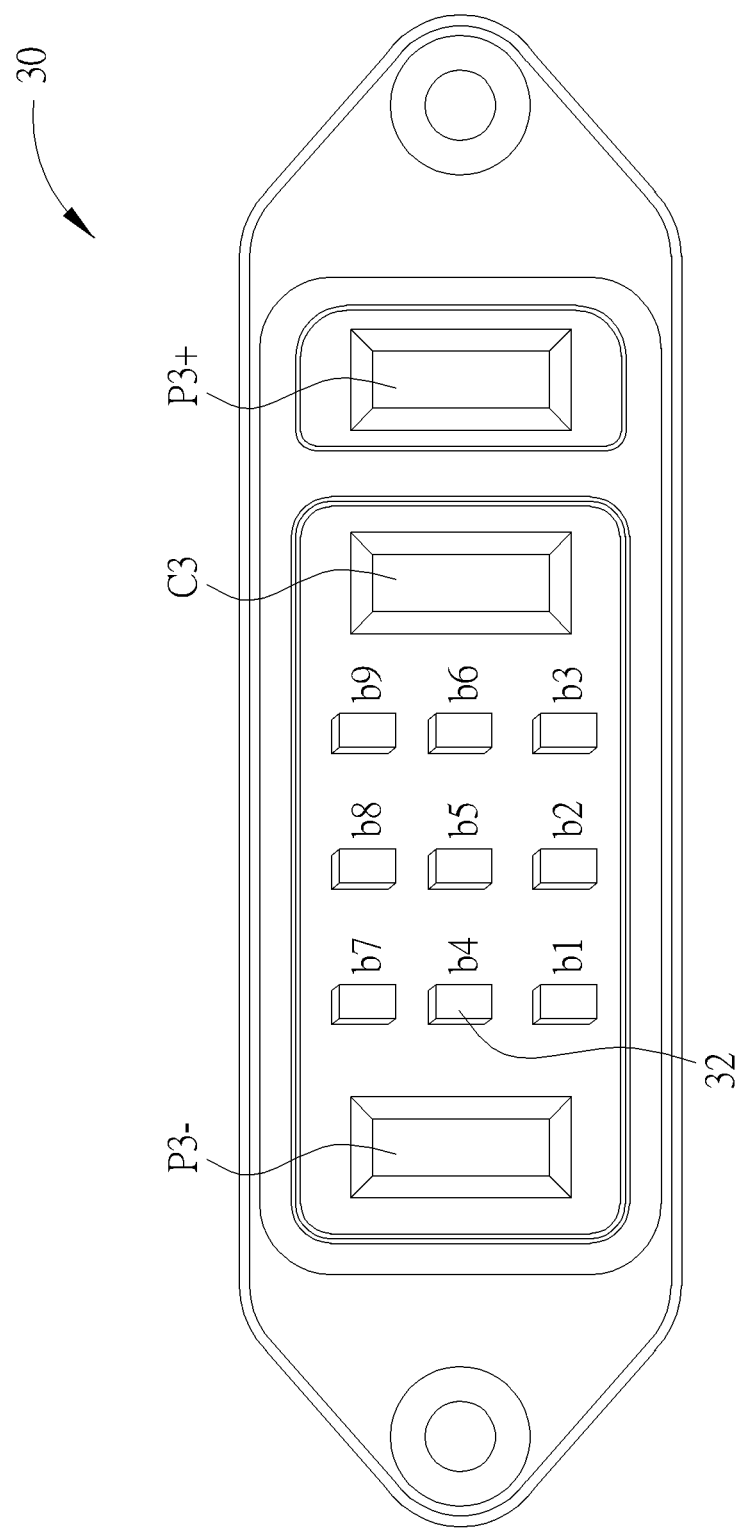
FIG. 4A is a diagram of the first connector of the multi-battery system of FIG. 1.

FIG. 4A is a diagram of the first connector 30 of the multi-battery system 100 of FIG. 1. The identification unit 32 of the first connector 30 can be the third pin b4. The CANBUS pins can be pin b8 and pin b9. The UART pins can be pin b2 and pin b3. The first positive terminal P3+ of the first connector 30 is connected to the positive terminal P1+ of the battery connector 12, and the first negative terminal P3− of the first connector 30 is connected to the negative terminal P1− of the battery connector 12.

When the first identification unit 32 is set to a first predetermined value, for example, a first electric potential, and the detection unit 14 is connected to the first identification unit 32, the battery 10a is set as the master battery. The microcontroller 16 then controls the battery 10a to perform the function of the master battery. When the third pin b4 is not electrically connected to the first negative terminal P3−, the first electric potential is at high level.

Figure 4B:
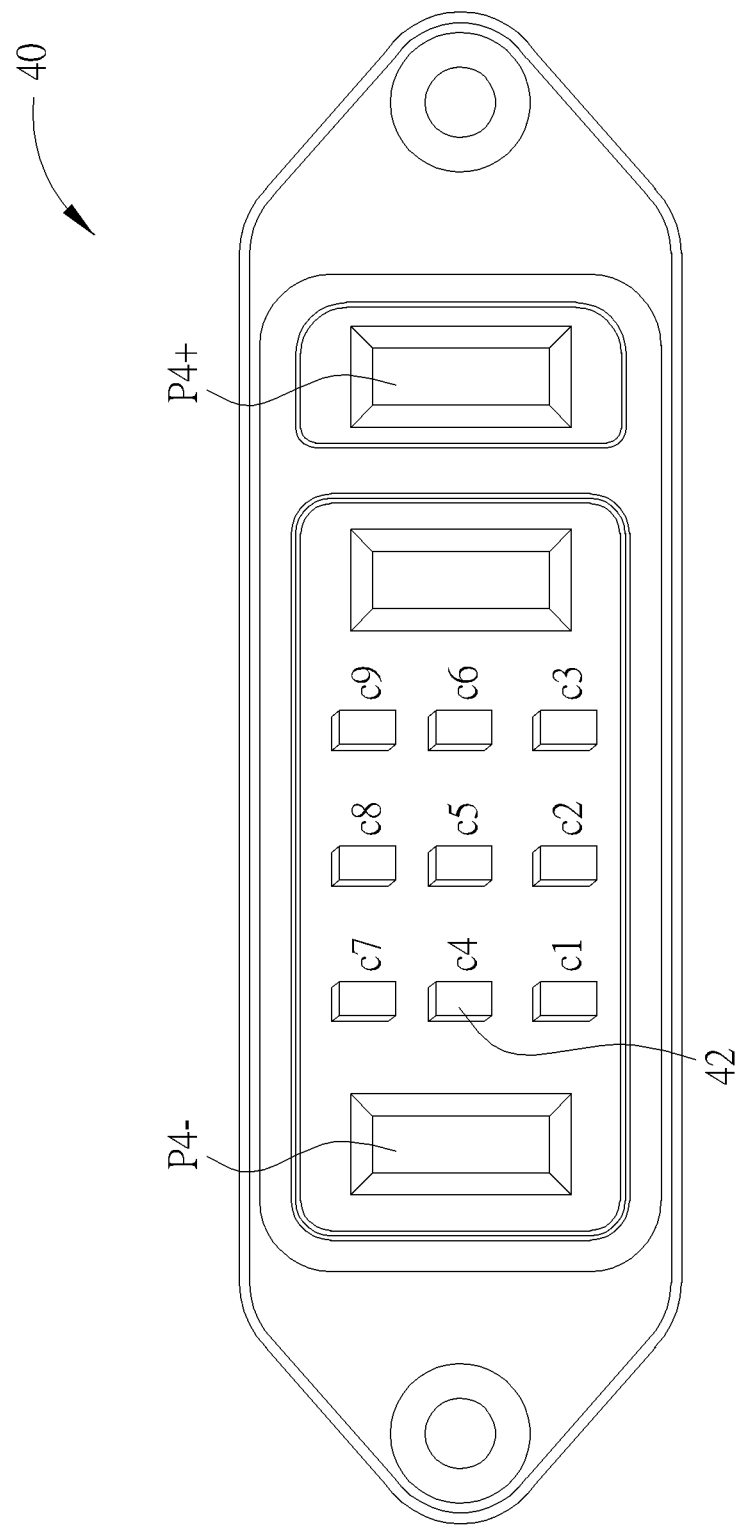
FIG. 4B is a diagram of the second connector of the multi-battery system of FIG. 1.

FIG. 4B is a diagram of the second connector 40 of the multi-battery system 100 of FIG. 1. The second identification unit 42 of the second connector 40 can be the fifth pin c4. The CANBUS pins can be pin c8 and pin c9. The second positive terminal P4+ of the second connector 40 is connected to the positive terminal P2+ of the battery connector 12, and the second negative terminal P4− of the second connector 40 is connected to the negative terminal P2− of the battery connector 12.

When the second identification unit 42 is set to a second predetermined value, for example, a second electric potential, and the detection unit 14 is connected to the second identification unit 42, the battery 10b is set as the slave battery. The microcontroller 16 then controls the battery 10b to perform the function of the slave battery. When the fifth pin c4 is electrically connected to the second negative terminal P4−, the second electric potential is at low level.

For example, when pin b4 of the first identification unit 32 is connected to the first positive terminal P3+, the first predetermined value of the first identification unit 32 is set to the high electric potential, and the firmware of the microcontroller 16 of the battery 10a makes the battery 10a to perform the function of the master battery. When pin c4 of the second identification unit 42 is connected to the second negative terminal P4−, the second predetermined value of the second identification unit 42 is set to the low electric potential, and the microcontroller 16 of the battery 10b makes the battery 10b to perform the function of the slave battery.

Figure 5:
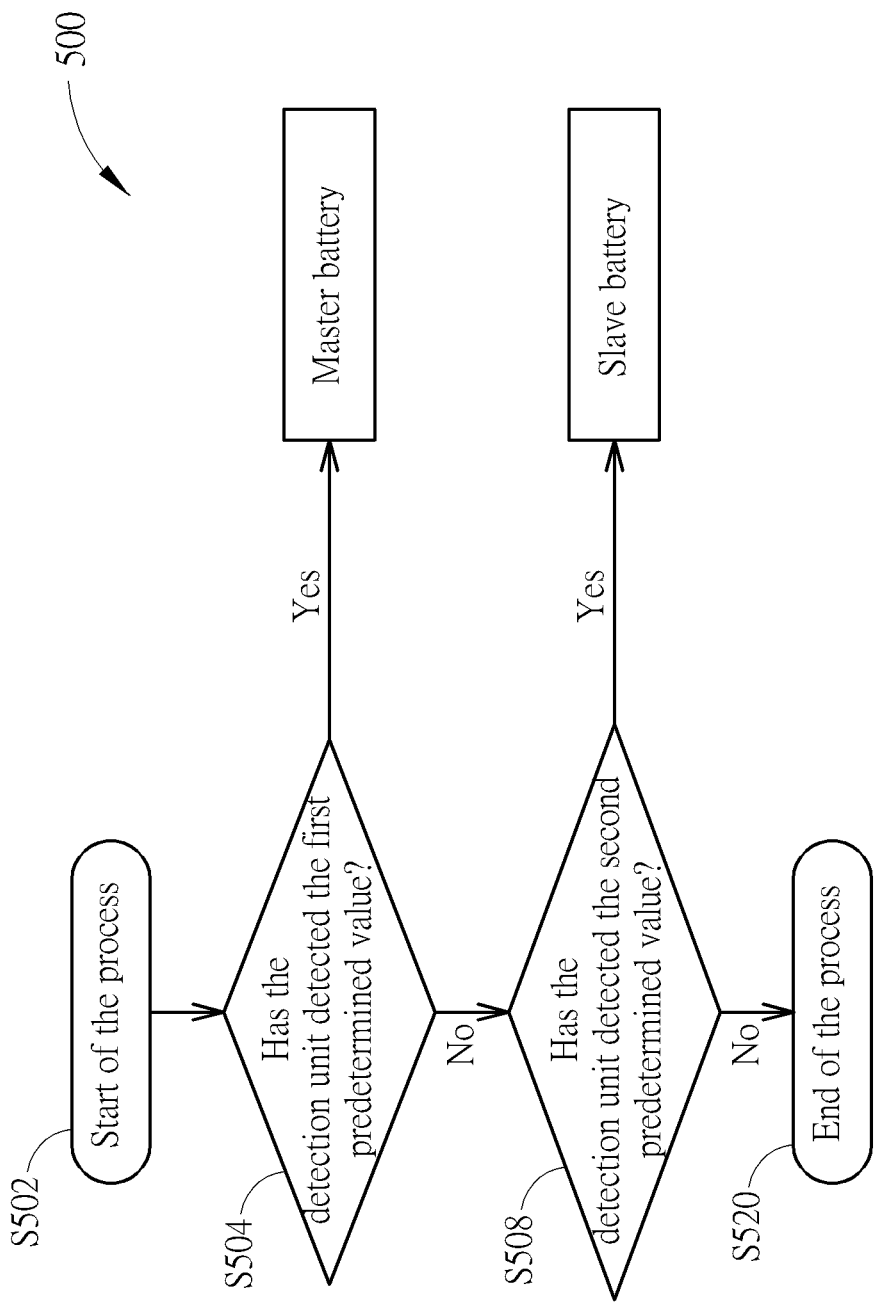
FIG. 5 is a flowchart of the firmware in the multi-battery system in FIG. 1 determining the operation mode of the battery.

FIG. 5 is a flowchart of the firmware in the multi-battery system 100 in FIG. 1 determining the operation mode of the battery. The method 500 includes the following steps:

S502: Start of the process;

S504: If the detection unit 14 of the battery 10a detects the first predetermined value, the firmware determines that the battery 10a is the master battery, otherwise, execute step S508;

S508: If the detection unit 14 of the battery 10a detects the second predetermined value, the firmware determines that the battery 10a is the slave battery; otherwise, execute step S520;

S520: End of the process.

The firmware of the microcontroller 16 detects the first predetermined value and the second predetermined value of the detection unit 14 to determine whether the battery is the master battery or the slave battery. The first predetermined value is, for example, a first electric potential value, and the second predetermined value is, for example, a second electric potential value. For example, when the pin a4 has a high electric potential, the first electric potential value is high, and the firmware determines that the battery 10a is the master battery. When pin a4 has a low electric potential, the second potential value is low, and the firmware determines that the battery 10a is the slave battery.

In addition, the first predetermined value of the first identification unit 32 can be the first signal sent by the motor controller 50, for example a square wave signal provided by the motor controller 50 at pin b4. When the detection unit 14 detects the square wave signal, the microcontroller 16 sets the battery 10a as the master battery. Similarly, the motor controller 50 provides the pin c4 with a second signal, such as a triangle wave signal. When the detection unit 14 detects the triangle wave signal, the microcontroller 16 sets the battery 10a as the secondary battery.

Figure 6:
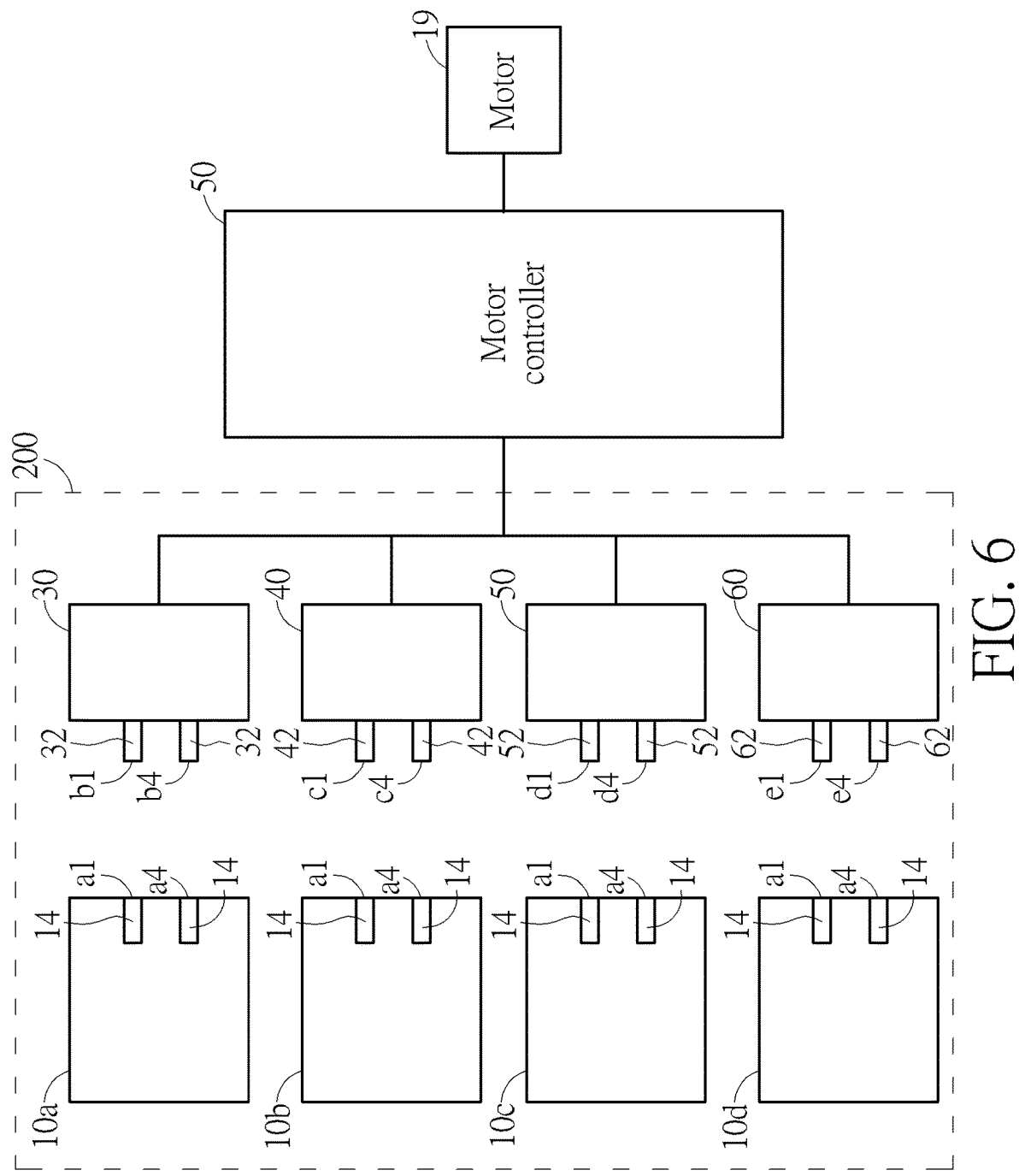
FIG. 6 is a diagram of a multi-battery system of another embodiment.

FIG. 6 is a diagram of a multi-battery system 200 of another embodiment. As shown in FIG. 6, when the multi-battery system 200 includes four batteries 10a, 10b, 10c and 10d, each detection unit 14 can use two pins (first pin a4 and second pin a1) to detect the first, second, third and fourth predetermined values respectively associated with the first, second, third and fourth connectors 30, 40, 50, 60. The first identification unit 32 has a third pin b4 and a fourth pin b1. The second identification unit 42 has a fifth pin c4 and a sixth pin c1. The third identification unit 52 has a seventh pin d4 and an eighth pin d1. The fourth identification unit 62 has a ninth pin e4 and a tenth pin e1. When the detection unit 14 detects the first predetermined value, the battery 10a is set to perform the function of the master battery. When the detection unit 14 detects the second, third or fourth predetermined value, the battery 10a with the predetermined value is set as secondary battery. For example, the first predetermined value represents that the two pins (b4, b1) of the first identification unit 32 both have high electric potential, and the second predetermined value represents that the two pins (c4, c1) of the second identification unit 42 have respectively low electric potential and high electric potential. The third predetermined value represents the two pins (d4, d1) of the third identification unit 52 have respectively high electric potential and low electric potential, and the fourth predetermined value represents the two pins (e4, e1) of the fourth identification unit 62 both have low electric potential.

Figure 7:
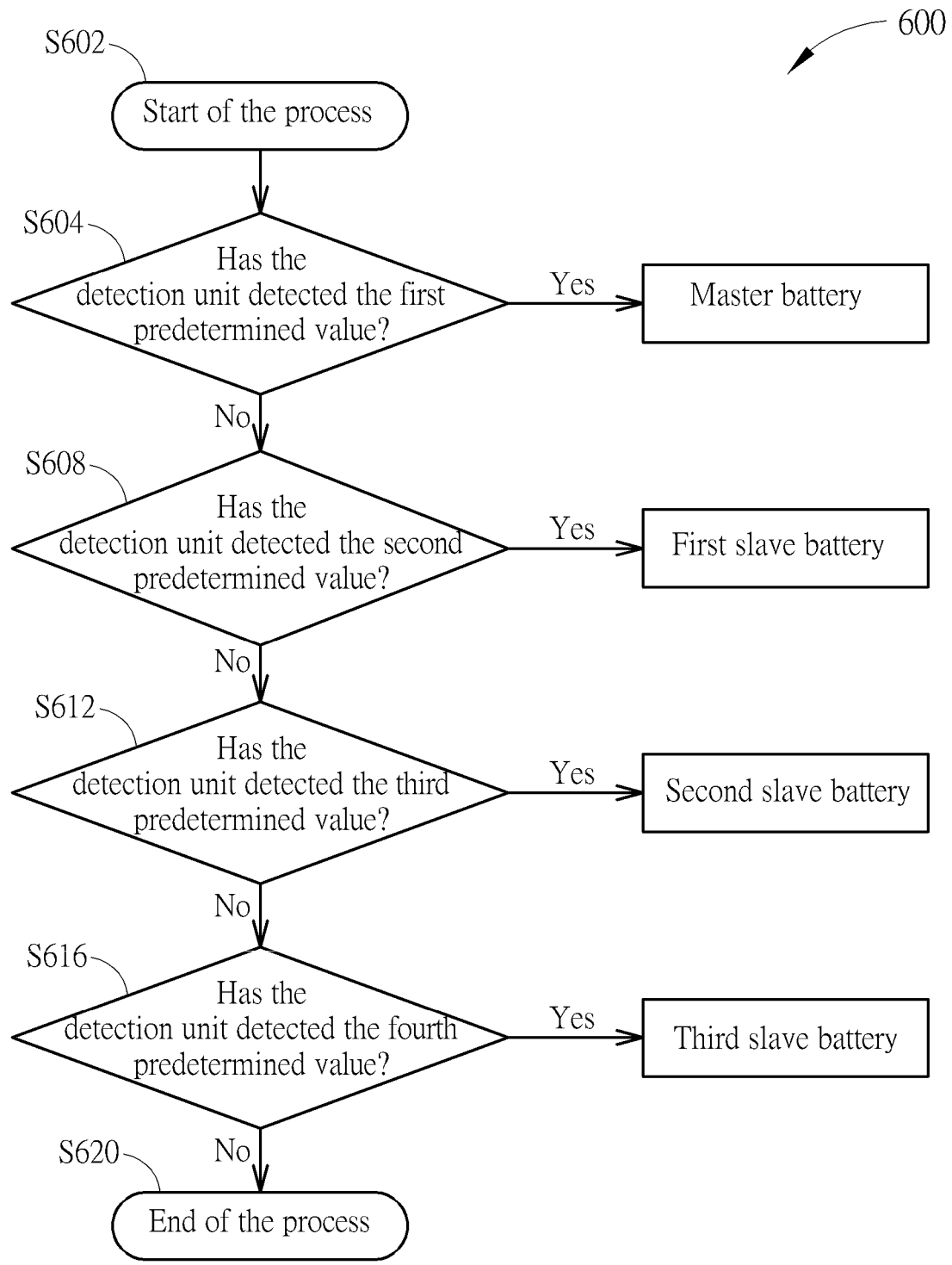
FIG. 7 is a flowchart of the firmware in the multi-battery system in FIG. 6 determining the operation mode of the battery.

FIG. 7 is a flowchart of the firmware in the multi-battery system 200 in FIG. 6 determining the operation mode of the battery. The method 600 includes the following steps:

S602: Start of the process;

S604: If the detection unit 14 of the battery 10a detects the first predetermined value, the firmware determines that the battery 10a is set to be the master battery; otherwise, execute step S608;

S608: If the detection unit 14 of the battery 10a detects the second predetermined value, the firmware determines that the battery 10a is the first slave battery; otherwise, execute step S612;

S612: If the detection unit 14 of the battery 10a detects the third predetermined value, the firmware determines that the battery 10a is the second slave battery; otherwise, execute step S616;

S616: If the detection unit 14 of the battery 10a detects the fourth predetermined value, the firmware determines that the battery 10a is the third slave battery; otherwise, execute step S620;

S620: End of the process.

The main function of the master battery is to detect its own voltage and power and the voltage and power of each slave battery. Also, the master battery can control the charging and discharging of each slave battery based on voltage level or power level. In addition, the master battery also detects the temperature and other operating data of itself and each slave battery, and communicates with the motor controller through a communication protocol, such as UART. The slave battery and the master battery are connected by a cable, and a communication protocol, such as CANBUS, is implemented to communicate between the batteries to determine whether to start or shutdown the slave battery. The slave battery receives instructions from the master battery to determine whether to supply power to the motor. If an error occurs during operation, it can also send an error message to the master battery for further process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-battery system for an electric vehicle comprising:
   a plurality of batteries, each comprising:
      a microcontroller; and
      a battery connector having a detection unit;
   a first connector having a first identification unit, and configured to electrically connect a battery connector of a first battery of the plurality of batteries and a motor controller; and
   a second connector having a second identification unit, and configured to electrically connect a battery connector of a second battery of the plurality of batteries and the motor controller;
   wherein:
      the motor controller is coupled to a motor of the electric vehicle for providing power and control signals to the motor and for setting the each battery to be a master battery or a slave battery;
      when the first identification unit is set to a first predetermined value, and a detection unit of the first battery is electrically connected to the first identification unit, a microcontroller of the first battery sets the first battery as the master battery; and
      when the second identification unit is set to a second predetermined value, and a detection unit of the second battery is electrically connected to the second identification unit, a microcontroller of the second battery sets the second battery as the slave battery.

2. The multi-battery system of claim 1, wherein the detection unit of the first battery comprises a first pin, and the first identification unit comprises a third pin.

3. The multi-battery system of claim 2, wherein the second identification unit comprises a fifth pin, and the fifth pin is electrically connected to a second electric potential.

4. The multi-battery system of claim 1, wherein the detection unit comprises two pins, the first identification unit comprises two pins, and the two pins of the first identification unit provide the first predetermined value.

5. The multi-battery system of claim 1, wherein the first predetermined value is a first electric potential value, and the second predetermined value is a second electric potential value.

6. The multi-battery system of claim 1, wherein the first predetermined value is a first signal, and the second predetermined value is a second signal.

* * * * *